H. DREWELL.
TYPE SETTING MACHINE.
APPLICATION FILED SEPT. 4, 1913.
1,145,359.
Patented July 6, 1915.
6 SHEETS—SHEET 1.
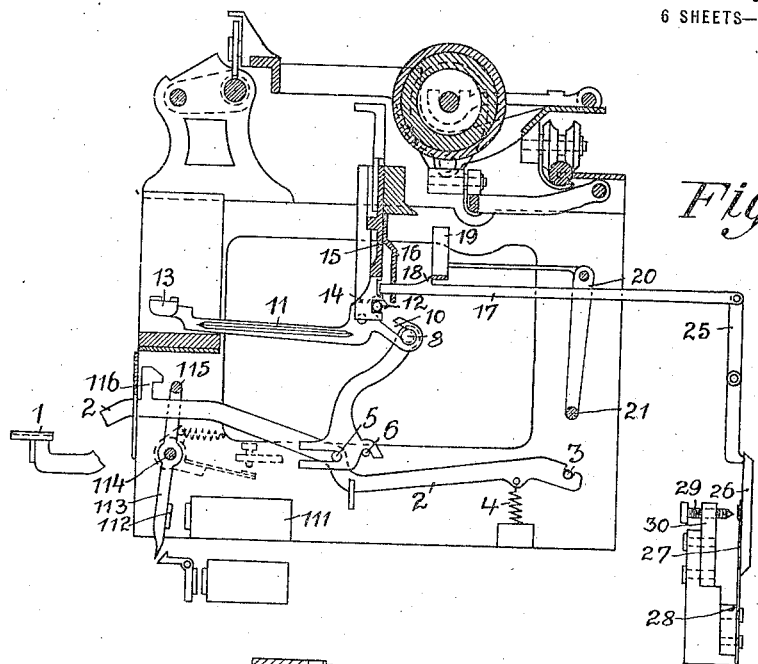
Fig.1.
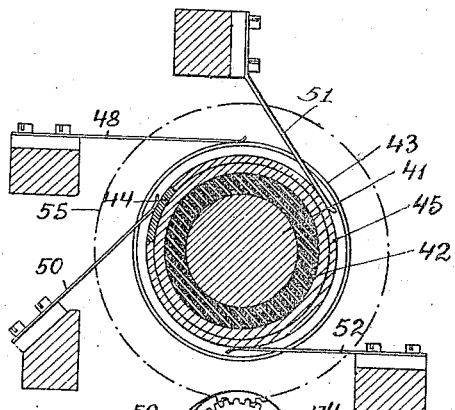
Fig.2.
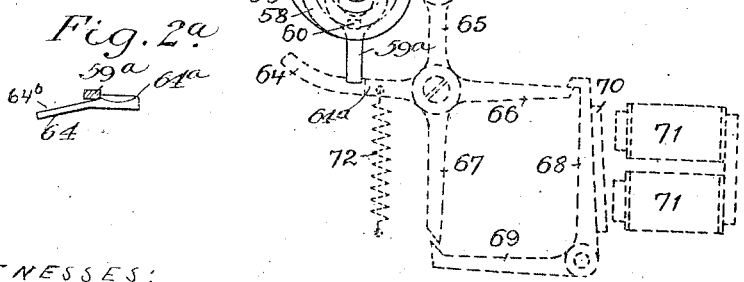
Fig.2ª
WITNESSES:
John C. Sanders
Albert P. Newman
INVENTOR:
Heinrich Drewell
by M. Ballou White
ATTY

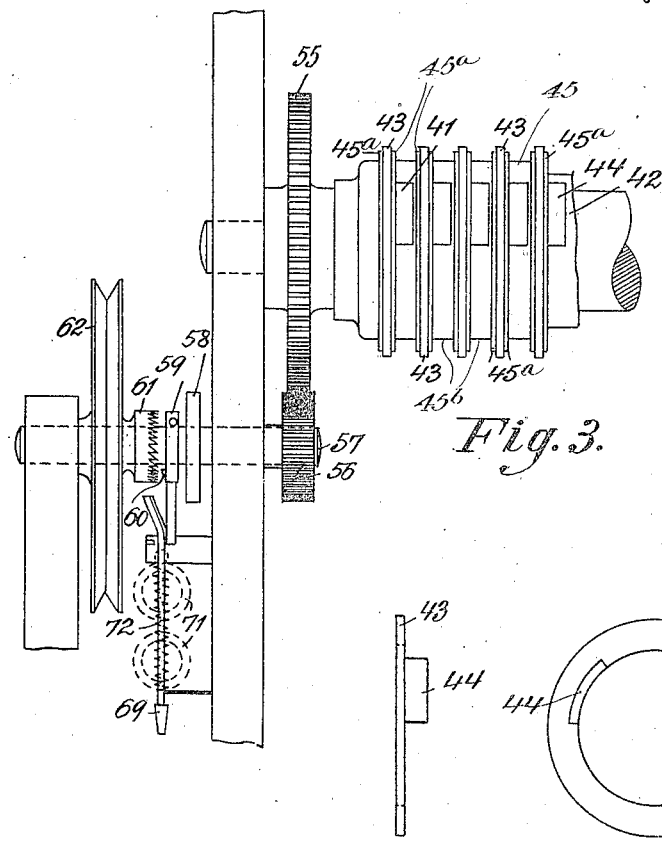
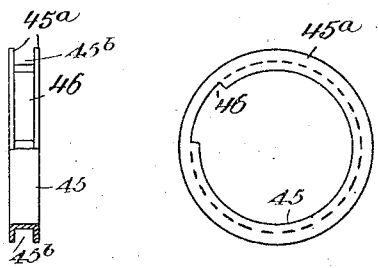

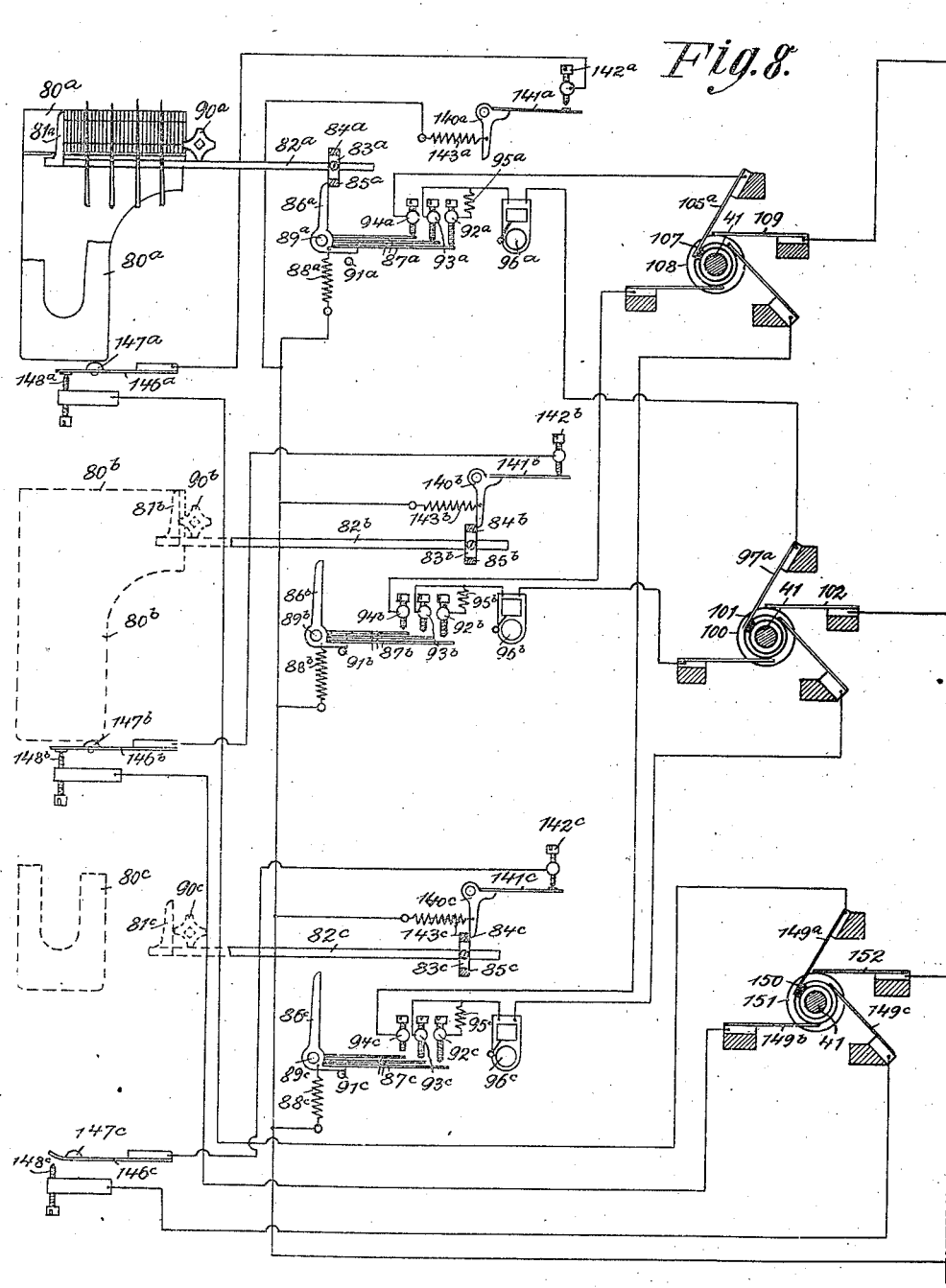

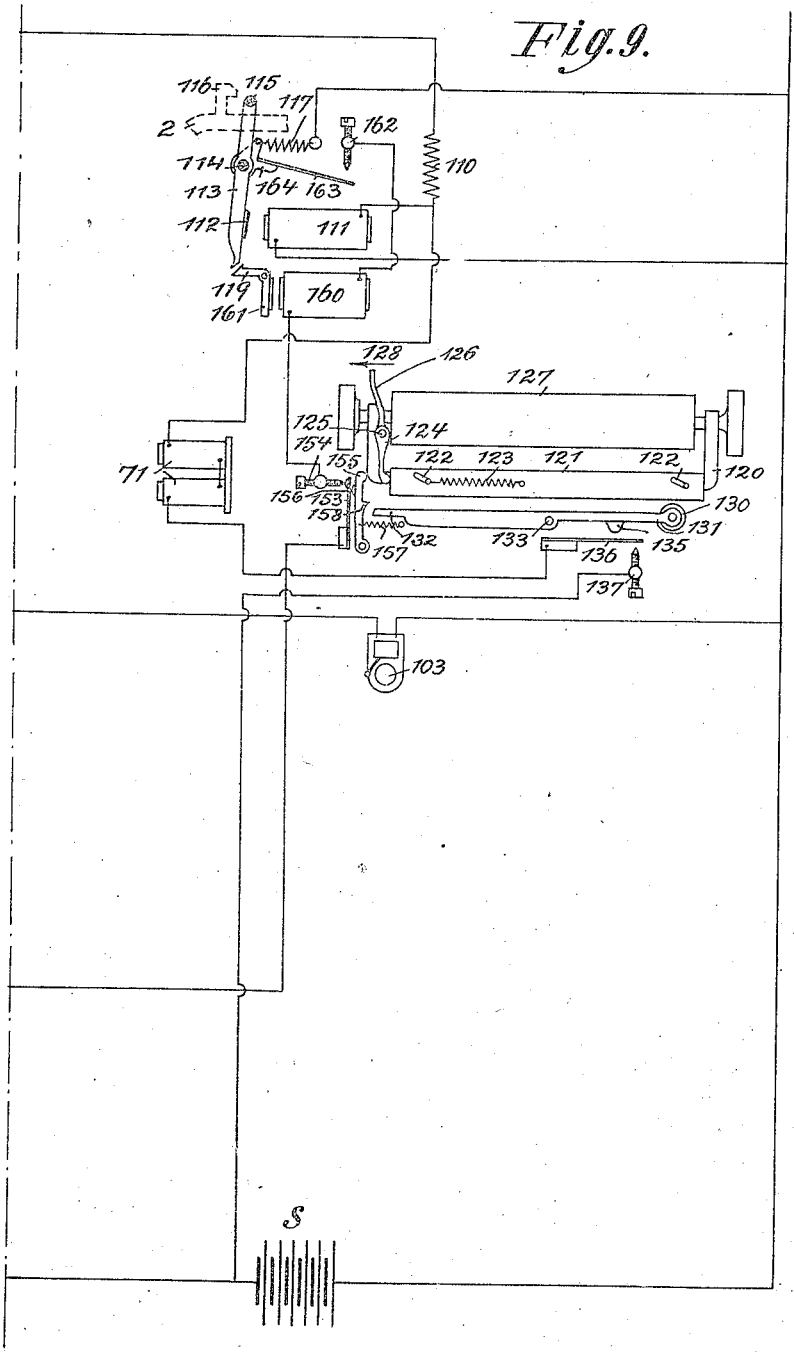

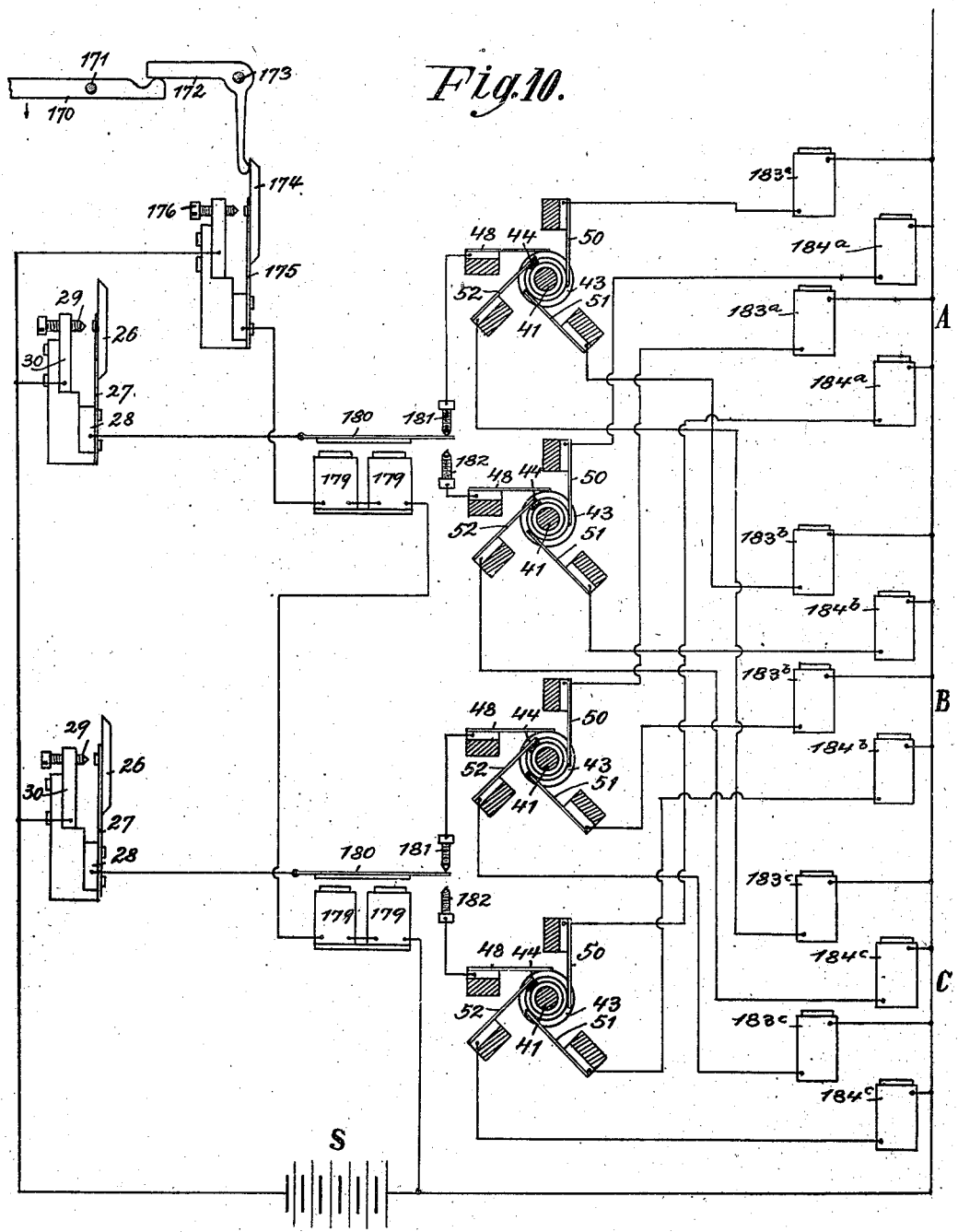

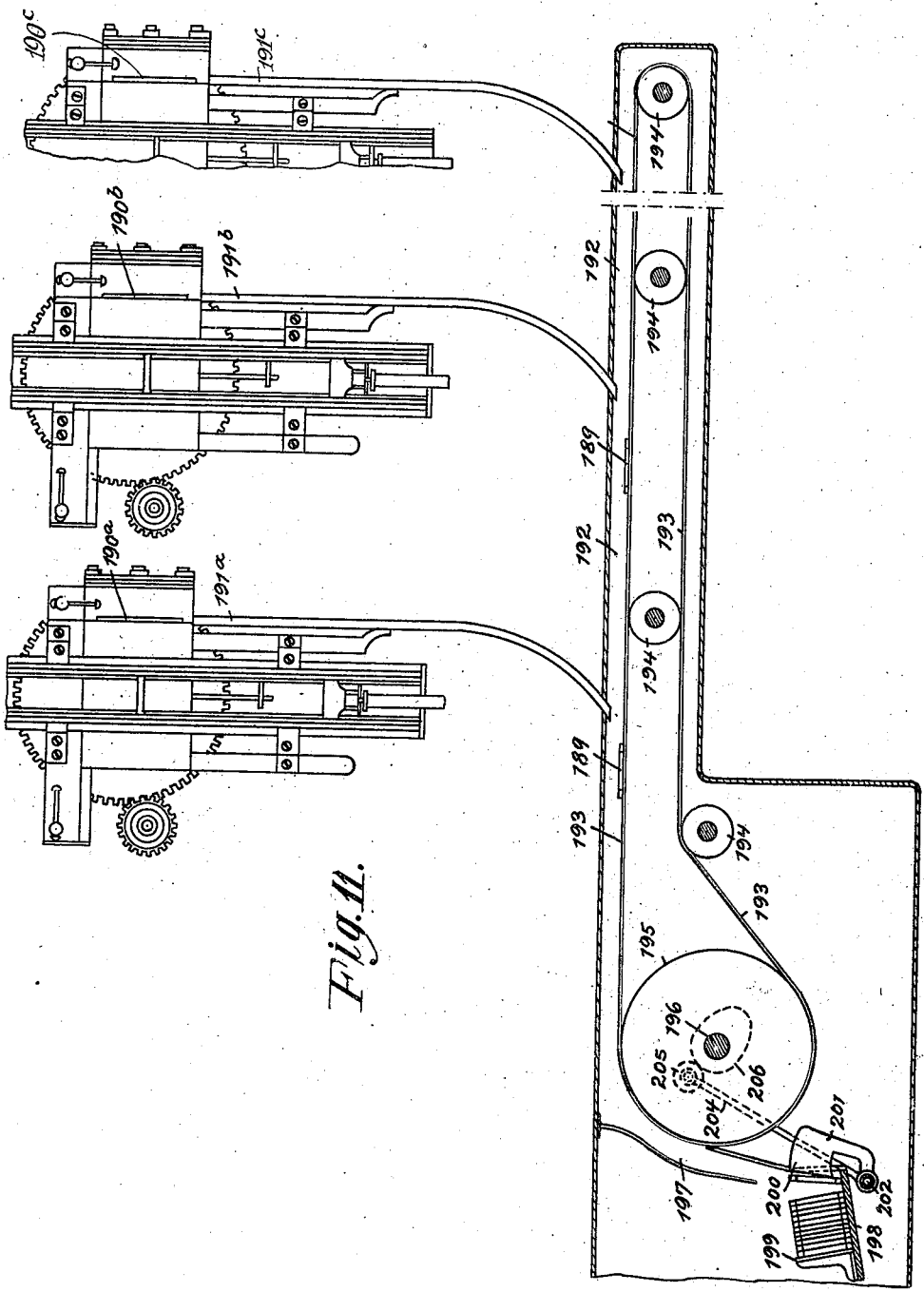

UNITED STATES PATENT OFFICE.

HEINRICH DREWELL, OF CHARLOTTENBURG, GERMANY.

TYPE-SETTING MACHINE.

1,145,359.  Specification of Letters Patent.  Patented July 6, 1915.

Application filed September 4, 1913. Serial No. 788,060.

*To all whom it may concern:*

Be it known that I, HEINRICH DREWELL, a subject of the German Emperor, residing at 16 Stuttgarten Platz, Charlottenburg, near Berlin, Germany, have invented new and useful Improvements in Type-Setting Machines, of which the following is a specification.

My invention relates to apparatus for rapidly setting up type by means of well-known matrix-setting and line-casting machines, and a primary object is to provide apparatus specially adapted for setting up the latest news in newspaper-printing rooms, and for similar purposes requiring rapid type-setting.

According to my invention, the keys of a key-board which is common to, and adapted to be successively operatively connected with several line-casting machines are depressed according to the matter to be set up, the said keyboard being operatively connected to a different line-casting machine after each line, so that the operator can continue to work immediately after each line without needing to wait until the line has been quite finished, e. g. justified with hand matrices, corrected and so on. The common keyboard employed is preferably the keyboard of a typewriting-machine, because the operator can then continually read what matter is being set. The keys of this typewriter are adapted to be successively operatively connected to the keys of the type-setting machines, electric, pneumatic, mechanical or other means being employable for establishing this connection. Any desired type of typewriter, as also of type-setting machine may be employed; for the latter the line-casting machine is specially suitable, because in this machine the finished lines are most readily conveyed to the common receiver. The length of the line is adjusted in the line-casting machine; as soon as a full line is obtained, a signal is transmitted from the type-setting machine to the neighborhood of the typewriter and indicates to the operator of the typewriter that he must begin a new line. When the paper-carriage of the typewriter is returned for this purpose, a change-over device is actuated whereby the operative connection with the typewriter keys is changed over from one to another typesetting machine. The line of matrices set in the first line-casting machine is now inspected by a special operator for justification requirements and for possible errors, and then transferred to the casting device for casting a corresponding type-bar. For completing justification, the inspecting operator may himself previously insert hand matrices. To insure regular coöperation between the typewriter and the line-casting machines, I provide, in addition, that the keys of the typewriter are locked so long as none of the line-casting machines is ready for being operated and is properly connected with the keys of the typewriter.

For assembling the finished type-bars in the order of their production I provide an assembling device which, by means of a conveyer belt, conveys the type-bars to a common receiver and arranges them in proper order.

To these ends my invention consists in the construction, combination and arrangement of parts described hereinafter and pointed out in the claims.

One illustrative embodiment of my invention is represented by way of example in the accompanying drawings wherein:—

Figure 1 is a vertical section showing a type writer of substantially known form comprising a simple shift-key mechanism, and the types being arranged to strike the front of the platen; Fig. 2 is a transverse section showing the change-over device; Fig. 2ª shows a detail; Fig. 3 is a side elevation showing both the drum comprised in this device, and the coupling mechanism associated therewith, and Figs. 4 and 5, and Figs. 6 and 7 are detail views showing two parts of the same device; Fig. 8 is the one part of a diagram showing a system of connections and those portions of the type-setting machine, change-over device and typewriter which are requisite for explaining my invention, the remaining part of this diagram being shown in Fig. 9; Fig. 10 is a like view showing means for connecting two typewriter keys with the corresponding keys of three line-casting machines, as well as the device associated with the shift-key, and Fig. 11 is an elevation, partly in section, showing the assembling apparatus for two line-casting machines.

Referring first to Fig. 1, this typewriting machine comprises the key-lever 2 carrying the key 1 and rotatable about the fulcrum 3; a pin 5 mounted on this key-lever enters into the slot in an angle-lever 7 rotatable about the fulcrum 6. The longer arm of the latter lever carries a pin 8 which enters into a slot 10 in the type-lever 11. This type-lever, which rocks about the axle 12 and carries at its free end the type 13, has a lug 14 which, in the known form of this typewriter, actuates a member for releasing the feed mechanism of the carriage. In adapting this type of typewriter for the purposes of my invention, I modify this known arrangement and provide that each type-lever shall actuate a separate bar 17 and drive it rearwardly when the appertaining key is depressed. Each bar 17 has a lug 18, and opposite all these lugs is located a common U-frame 19 which, when any key is depressed, is driven back and brings about the feed of the carriage in known manner. Each bar 17 is connected to a two-armed lever 25 and by means of the latter influences the piece of insulation 26 carried by a contact-spring 27. The latter is fast on a terminal 28 and faces a contact-screw 29, mounted in another terminal 30. The contact-spring 27 tends to contact with the screw 29, but is normally prevented from doing so by the two-armed lever 25. When, however, the key associated with this lever is depressed, the lever 25 is rocked, whereupon the spring 27 contacts with the screw 29, and so closes the circuit of the corresponding key-magnet of the line-casting machine, this magnet being at once energized and its key depressed.

The above-mentioned spring and screw make contact at approximately the same moment as that at which one of the types 13 strikes the paper, and consequently certainty is obtained that the typed character agrees with the character set by the line-casting machine. Moreover, should another key be accidentally lightly touched, two circuits are not closed, because contact is not made until the key is completely depressed.

The multiple change-over switch for establishing the successive operative connection between the keys of the typewriter and those of the line-casting machine comprises a contact-drum (Figs. 2 and 3), having as many contact-rings 43 as there are keys on each of the line-casting machines. These contact-rings are mounted on a rotatable axle 41, and are insulated therefrom by means of a bushing 42 of electrically insulating material. Each contact-ring 43 has a lateral lug 44 (Figs. 4 and 5) and the various contact-rings are separated by intermediate rings 45 of insulating material (Figs. 6 and 7). The latter are of U-section and each has a recess 46 into which the lug 44 of an adjacent contact-ring 43 enters. The outer face of the lug 44 is not covered, so that a contact-spring located in the groove 45$^b$ formed between the flanges 45$^a$ of the rings 45, can make contact with this lug.

Contact-springs 48 slide on the annular ribs on the drum which are constituted by the rings 43, and each of these springs or brushes 48 is connected to one of the above-described key contact devices of the typewriter. In the grooves 45$^b$ formed between the flanges 45$^a$ of the rings 45 are located three other contact-springs 50, 51, 52 each of which is connected to a key-electromagnet of one of the three line-casting machines. For example, when the contact-spring 48 is connected to the contact-device for the $a$-key of the typewriter, the contact-spring 50 will be connected to the magnet for the $a$-key of the first line-casting machine, the contact-spring 51 to the magnet for the $a$-key of the second machine, and the contact-spring 52 to the magnet for the $a$-key of the third.

When a typewriter having a complete keyboard is employed, each key thereof will be associated with a corresponding contact-spring 48. When a typewriter having a single shift-key action is employed, each key will be provided with two contact-springs 48 which can be connected by means of the shift-key alternately to the corresponding contact-device for the key.

On the main axle 41 of the change-over device is mounted a gear 55 (Fig. 3) meshing with a gear 56 on the auxiliary axle 57. The latter carries a disk 58 to which a fork-like coupler 59 is pivotally connected in such manner that it can rotate in the direction of the auxiliary shaft 57. The coupler 59 has a tooth 60, and opposite the latter is mounted a crown-wheel 61, whereinto the tooth 60 can snap under the action of a suitable spring. This engagement is normally prevented owing to the free end 59$^a$ of the coupler 59 bearing against an arm 64 (Fig. 2) of a four-armed lever 64, 65, 66, 67. A spring 72 tends to withdraw this arm 64 from the coupler 59, but is normally prevented by a double detent 68, 69, which has the form of an angle-lever. On one arm 68 of this double detent is mounted the armature 70 of an electromagnet 71. When the latter is energized, the detent 68 is withdrawn from the arm 66, whereupon the spring 72 draws the arm 64 away from the coupler 59. The tooth on the latter therefore engages with the crown-wheel 61 and is driven by the latter. To this crown-wheel is connected a sheave 62 by means of which the crown-wheel 61 is continuously rotated. On the disk 58 is a cam 73 which, when the axle 57 rotates, coacts with the antifriction roller 74 on the lever arm 65 and consequently drives the four-armed lever 64, 65, 66, 67, back so far that it tends to drive the arm 67 past the detent 69. Should the armature 70 of magnet 71 be attracted at this moment, the arm 67 will be first of all retained by the detent 69. When the armature 70 falls back, the detent 69 releases the arm 67, but the arm 66 is then caught by the detent 68. If, while the cam 73 is coacting with the roller 74, the armature 70 is not attracted, the lever-arm 66 at once bears against the detent 68 without the arm 67 being previously held by the detent 69. The double detent 68, 69 is for preventing the axle 57 rotating a number of times when the magnet 71 is energized only once. To stop the axle 57 after having made a complete revolution, the arm 64 is provided with a beveled face 64$^b$ and a shoulder 64$^a$ (Figs. 2$^a$ and 3). Near the end of the revolution of the axle 57 the free end 59$^a$ of the coupler 59 slides on the beveled face 64$^b$ and is thereby withdrawn from the crown-wheel 61. Having completed the revolution the arm 59$^a$ abuts against the shoulder 64$^a$, which prevents further rotation.

In the embodiment illustrated, one revolution of the auxiliary axle 57 rotates the main axle 41 one third of a revolution. The contact-lugs 44 are therefore moved from one row of contact-springs to the next, whereby the movements of the typewriter keys are transmitted to another type-setting machine. If the row of lugs 44 is first located below the springs 50, then, after the rotation of the axle 57, this row of lugs will be located under the springs 51, so that these are then electrically connected to the springs 48.

When matrix-setting and line-casting machines, *e. g.* those of the Mergenthaler type, are employed in combination with the typewriter, each key of the typewriter is operatively connected with the corresponding key of the line-casting machine in such manner that when a typewriter key is depressed, the corresponding key of the line-casting machine is also depressed. Consequently, as is well known, a matrix having the symbol corresponding to that of the key is released from the magazine and conveyed to the elevator. The various matrices are there assembled in lines. The spaces between the words are thereupon filled, also in known manner, with space-bars for making all lines of equal length.

Fig. 8 diagrammatically shows the elevators of three matrix-setting and line-casting machines, together with the devices associated therewith for measuring the length of the line.

The corresponding parts of the three line-casting machines and of the electric circuits associated therewith are designated by the same reference numbers, letters being added as exponents, the reference numbers of all the parts associated with the first line-casting machine having the exponent "*a*," those of the parts associated with the second machine the exponent "*b*," and those of the parts associated with the third machine the exponent "*c*." The parts designated by the same numbers but different exponents are alike in form and operation. Hence, in the following description reference will first of all be made to the mode of operation of the devices associated with only one line-casting machine.

The elevator 80$^a$ contains the support 81$^a$ located at the end of a slide 82$^a$. When being set up the line of matrices is held in known manner between the support 81$^a$ and the collecting star 90$^a$. On the slide 82$^a$ is a tappet 83$^a$ which is slidable thereon and can be clamped in a position adapted to the length of the line. This tappet has two extension pieces 84$^a$, 85$^a$ of electrically insulating material. When the line of matrices has nearly obtained that length for which adjustment has been made, the insulating piece 85$^a$ actuates a stepped circuit-closing device comprising an angle-lever 86$^a$, to the horizontal arm of which are fastened several leaf-springs 87$^a$. When the slide is driven farther forward these leaf-springs come successively into contact with three contact-screws 92$^a$, 93$^a$, 94$^a$. The first of these screws is connected to the second through a resistance 95$^a$, and the second screw is directly connected to an electric bell 96$^a$ which in turn, is connected to a contact-spring 97$^a$. When the multiple change-over switch is in the correct position therefor, the contact-spring 97$^a$ contacts with the lug 101 of a slip-ring 100 which is connected over another contact-spring 102 to a second electric bell 103. The angle-lever 86$^a$ is connected to one pole of the source of current S, and the bell 103 is connected with the other pole of the same. Now as soon as the longest of the leaf-springs 87$^a$ contacts with the screw 92$^a$, the bells 96$^a$ and 103 will ring and indicate both to the operator at the line-casting machine and to the operator at the typewriter that the line is approaching completion. When the line increases in length, the screw 93$^a$ will make contact, the resistance 95$^a$ being thus short-circuited. The bells 96$^a$ and 103 therefore ring more loudly, thus indicating that the line has still further approached its maximum permissible length and must soon be brought to an end. When the line attains its maximum length, the shortest of the springs 87$^a$ contacts with the screw 94$^a$ which is connected with a contact-spring 105$^a$ of the multiple change-over switch. When this switch is in the correct position therefor, this spring 105$^a$ contacts with the lug 107 of a slip-ring 108 on which a contact-spring 109 slides. The latter is connected over a resistance 110 to one terminal of the key-locking magnet 111 (Fig. 9) whose other terminal is connected to one pole of the source of current S. As soon as the shortest of the leaf-springs 87$^a$ contacts with the screw 94$^a$, the magnet 111 is energized and attracts its armature 112. The latter is fast on a frame 113 fulcrumed on the axle 114; the upper bar of this frame constitutes the key-locking bar 115 (Figs. 1 and 9). Owing to the armature 112 being attracted by the magnet 111, this frame is rocked until the locking-bar 115 passes below the hook-like lugs 116 on the key-levers 2, and the keys are thereby locked. Below the frame 113 is mounted a catch 119 which holds the frame in its key-locking position until the next line-casting machine is ready to continue setting the matrices.

When the paper-carriage of the typewriter is returned to its initial position, not only is the key-locking magnet 111 energized but also simultaneously therewith the magnet 71 which controls the multiple change-over switch. To effect this, a bar 121, mounted on the paper-carriage 120, has slanting guide-slots 122 through which two pins mounted on the frame of the paper-carriage pass. A spring 123 tends to draw the bar 121 upward and leftward, as seen in Fig. 9. A lever 124, which bears against the left-hand end of the bar 121, is fast on an axle 125 and by means of the latter is rigidly connected with the grip 126 at the front of the paper-carriage. This grip simultaneously serves in known manner not only to return the paper-carriage to its initial position, i. e. to the position for beginning the line, but also to turn the platen 127 an amount corresponding to the space between two lines. When the grip 126 is moved for this purpose in the direction of the arrow 128, the lever 124 is pressed against the bar 121 and the latter is therefore shifted from the left to right. Owing to the slanting slots 122, the bar 121 is also simultaneously moved downward. This downward movement is transmitted to an antifriction roller 130 carried below the bar 121 at the end of a two-armed lever 131, 132, and an intermediate insulating piece 135 carried by this lever presses a contact-spring 136 onto a contact-screw 137, so that the following circuit is closed:—one pole of the source of current S, contact-screw 137, contact-spring 136, change-over magnet 71, locking magnet 111, and the other pole of the source of current S. Contact between the contact-spring 136 and the contact-screw 137 therefore results in the magnets 71 and 111 being simultaneously energized and, consequently, not only in the keys of the typewriter being locked, but also in the change-over switch being actuated. Owing to these devices, it is impossible to write with the typewriter while the change-over operation is taking place. The key-lock is not released until the change-over operation is fully ended, and then only if that line-casting machine to which the keys of the typewriter are operatively connected after this operation is ready for a continuance of the work.

Reference has so far been made to the reference numbers having the exponent "$a$" for the reason given above. As, however, it is assumed that the typewriter has now been changed over to another type-setting machine, it will be convenient now to refer to the reference numbers having the exponent "$b$".

When the support $81^b$ of the next type-setting machine is in its initial position, i. e. in the position for beginning the line, the insulation $84^b$ at the top of the line-limiting tappet $83^b$ on the line-carrier or slide $82^b$ of this line-casting machine abuts against an angle-lever $140^b$. This tappet therefore extends the spring $143^b$ and presses the leaf-spring $141^b$ against a contact screw $142^b$. The angle-lever $140^b$ is electrically connected to one pole of the source of current S. The contact-screw $142^b$ is connected to another contact-spring $146^b$, which is located below the elevator $80^b$ and, when the latter bears against the piece of insulation $147^b$, is pressed onto a contact-screw $148^b$, as long as the elevator is in its lowest position, i. e. that in which it is adapted to receive the matrices. The contact-screw $148^b$ is connected to a contact-spring $149^b$ of the multiple change-over switch. When the latter is in the correct position therefor, this spring contacts with the lug 150 of a slip-ring 151 whereon a contact-spring 152 slides, the latter connecting the slip-ring 151 with a contact-spring 153 located on the typewriter. This latter spring can be influenced by a lever 155 which is rocked by the paper-carriage of the typewriter as soon as it returns into its initial position. In this position, a piece of insulation 156 carried by the lever 155 presses the contact-spring 153 against the contact-screw 154. The latter is electrically connected to the one terminal of the electromagnet 160 whose armature 161 is fast on the angle-lever having the detent-arm 119 (Figs. 1 and 9). The other terminal of the electromagnet 160 is electrically connected to a contact-screw 162 opposite to which is a contact-spring 163 carried by a lever 164 fast on the axle 114 of the key-locking frame 113. The lever 164 is electrically connected by means of a spring 117 to the source of current S. Contact between the contact-screw 162 and the contact-spring 163 occurs when the frame 113 is in the position wherein it locks the typewriter keys. In order that the electromagnet 160 may be able to attract its armature and, by releasing the detent 119 from the lower end of the frame 113, unlock the keys, contact must be made between the spring $141^b$ and the screw $142^b$, between the spring $146^b$ and the screw $148^b$, between the spring $149^b$ and the ring 150, between the spring 153 and the screw 154, and between the screw 162 and the spring 163. To bring this about the following conditions must be fulfilled:—1. The change-over switch must have quite reached one of its rest positions, in order that the lug 150 may contact with one of the three contact-springs 149ª, 149ᵇ and 149ᶜ. 2. The line-carrier of that line-casting machine whose keys are operatively connected to the keys of the typewriter, with the change-over switch in its present position, must be in the position for beginning the line. 3. The elevator of this line-casting machine must be in the position wherein it is adapted to receive the matrices. 4. The paper-carriage of the typewriter must be in its initial position. 5. The keys of the typewriter must be locked. In the described apparatus it is of no importance in what order these conditions are individually fulfilled; as soon as they are all simultaneously fulfilled, the magnet 160 is energized, but immediately after the purpose of the energizing current is fulfilled, the circuit through which it is supplied is broken between the contact-screw 162 and contact-spring 163. This occurs when the frame 113 returns to its normal position wherein the keys are not locked. When operating the type-writing machine with a high speed it might happen that the operator's hand when moving the paper carriage backward slips off from the grip 126; in such cases or by some other accident the bar 121 might be moved repeatedly.

To avoid the electromagnet being repeatedly energized and deënergized, and thus to avoid the change-over switch being repeatedly actuated, the lever 155 has a projection 158. This projection engages under the end of the lever-arm 132 of the two-armed lever 131, 132, on the latter being rocked into its contact-making position by the bar 121, and holds this lever firmly until the paper-carriage of the typewriter has completed its movement into its initial position. When, however, the paper-carriage 120 has been brought to its initial position, the change-over switch can, if desired, be again actuated by applying to the grip 126 pressure in the direction of the arrow 128. By so doing, the type-writing machine instead of being connected to that line-casting machine first of all connected to it, is connected to the one following, such change being made in the event of the former machine not being ready to continue setting the matrices.

Fig. 10 diagrammatically illustrates both the means for connecting the typewriter keys with the corresponding keys of three line-casting machines, and the devices associated with the mechanism for shifting from small letters to capitals or to figures and symbols. To effect the latter operation, the shift key actuates a contact device of a kind similar to that for a type-key. For this purpose the key-lever 170 of the shift-key of the typewriter extends beyond its fulcrum 171, and bears upwardly against the horizontal arm of an angle-lever 172 whose vertical arm influences the extension-piece 174 of a contact-spring 175, and normally holds this spring clear of a contact-screw 176. When the shift-key is depressed, the spring 175 contacts with this screw 176. The latter is connected to one pole of the source of current S, but the contact-spring 175 is connected to a number of magnets 179. These magnets are all connected in series, and the last in the row is connected to the source of current S. Each magnet 179 influences a pivoted armature 180 which is connected to the contact-spring 27 of one of the contact-devices for the ordinary keys. As long as the magnet 179 is currentless, the lever 180 carrying its armature contacts with an upper screw 181, serving as stop and contact-piece, which is connected over a contact-spring 48 (Fig. 9) to a slip-ring 43. Owing to the lug 44 on this ring, and to one of the three contact-springs 50, 51, 52, the contact-screw 181 is connected, according to the position of the multiple change-over switch, to one or another of the key-magnets 183ª, 183ᵇ, 183ᶜ, all of which set the same type-character of a line-casting machine, but belong to different line-casting machines. In a similar manner, the lower contact-screws 182, wherewith the armature levers 180 contact when attracted by their respective magnets, are connected over the contact-spring 48, the slip-ring 43, one of contact-springs 50, 51, 52 to one of the key-magnets 184ª, 184ᵇ, 184ᶜ. As long as the shift key of the typewriter remains unoperated, depression of a typewriter key results in the magnets 183ª, 183ᵇ, 183ᶜ being energized and the corresponding matrix-setting key being operated. If, however, the shift key is depressed before one of the typewriter keys, the armature-levers 180 are attracted, and consequently the contact-devices for the typewriter-keys are connected to the magnets 184ª, 184ᵇ or 184ᶜ; depression of a typewriter key now therefore actuates a key of the line-casting machine other than that actuated before operation of the shift key. In Fig. 10 the group of magnets designated A is associated with one line-casting machine, that designated B with a second machine, and that designated C with a third.

The line of matrices which has been set as described is conveyed in known manner to the casting apparatus of the line-casting machine, and the line is cast. The cast line after being ejected from the mold is conveyed to the trimming tool and then passes into a guide channel 191ª (Fig. 11) having a curved lower end through which the lines slide onto a conveyer belt 193. The latter forms the bottom of a passage 192, wherein the line is conveyed by the belt to the assembling place. The conveyer belt runs over guide-rollers 194 and over a driving pulley 195 which is continuously driven by a suitable source of power. The lines carried by the belt slide through a channel 197 into the galley 198, wherein they are assembled and supported by a bracket 199. At the entrance to the galley is a pusher 200 carried by a lever 201 rotatable about the axle 202. Fast on this axle is also one end of a second lever 204, carrying at its other end an antifriction roller 205 which runs on a cam or eccentric 206 mounted on the shaft 196 of the driving pulley 195. At each revolution of the shaft 196 the pusher 200 is driven into the galley and consequently forces the lines therein far enough back to allow room for the next line. A line which arrives while the pusher 200 is in the carrier, first of all falls on the top of the pusher and, on the latter being withdrawn, falls to the bottom of the galley.

In order that the lines may reach the galley in the order of their formation, the conveyer belt 193 must have a suitable speed. This is preferably chosen such that a line delivered by the machine most remote from the assembling place always reaches the galley earlier than a subsequent line supplied to the conveyer belt.

The above-described apparatus permits of the matrices or type being very rapidly set; e. g. at the rate of dictation, because the operator proper of the type-setting-machine, who in this case operates the typewriter, is not hindered by having to pay attention to the complicated mechanism of the line-casting or type-setting machine, and to the special work required for the type which is set. Moreover, by simultaneously employing several line-casting or type-setting machines a specially important reserve of plant is provided for emergencies, since, should one line-casting or type-setting machine be out of order, the remainder can be used by suitably changing over the operative connections.

I claim:—

1. In apparatus for making type-bars, the combination of a plurality of groups of means for actuating a plurality of line-casting machines, a keyboard, and means comprising a multiple change-over device for operatively connecting said keyboard alternatively to any of said groups of means.

2. In apparatus for making type-bars, the combination of a plurality of groups of means for actuating a plurality of line-casting machines, a type-writer, means comprising a multiple change-over device for operatively connecting the keyboard of said type-writer to each of said groups of means, and means actuated at the end of a line for shifting said change-over device and thereby changing over the connection of the keyboard from one of said groups of means to another.

3. In apparatus for making type-bars, the combination of a plurality of groups of means for actuating a plurality of line-casting machines, a type-writer, means comprising a multiple change-over device for operatively connecting the keyboard of said type-writer to each of said groups of means, electromagnetic shifting means actuated at the end of a line for shifting said switch and thereby changing over the connection of the keyboard from one of said groups of means to another, and electromagnetically actuated shift-controlling means for controlling said shifting means.

4. In apparatus for making type-bars, the combination of a plurality of groups of electromagnetic means for actuating a plurality of line-casting machines, a type-writer, means comprising a multiple change-over switch for operatively connecting the keyboard of said type-writer to each of said groups of means, shifting means actuated at the end of a line for shifting said switch and thereby changing over the connection of the keyboard from one of said groups of means to another, electromagnetically operated shift-controlling means for controlling said shifting means, and manually operated means for controlling said electromagnetically operated shift-controlling means.

5. In apparatus for making type-bars, the combination of a plurality of groups of means for actuating a plurality of line-casting machines, a keyboard, and means for operatively connecting said keyboard to any one of said groups of means; each line-casting machine having a driving member controlled according to the length of the line of matrices set up therein, and locking means for locking the keys of the keyboard and adapted to be actuated by each driving member.

6. In apparatus for making type-bars, the combination of a plurality of groups of means for actuating a plurality of line-casting machines, a keyboard, and means for operatively connecting said keyboard to any one of said groups of means; each line-casting machine having a driving member controlled according to the length of the line of matrices set up therein, locking means for locking the keys of the keyboard, and electromagnetic means comprising a change-over switch and controlled by the driving members for actuating the locking means.

7. In apparatus for making type-bars, the combination of a plurality of groups of electromagnetic means for actuating a plurality of line-casting machines, a type-writer, means comprising a multiple change-over switch for operatively connecting the keyboard of said type-writer to each of said groups of means, and means actuated at the end of a line for shifting said switch and thereby changing over the connection of the keyboard from one of said groups of means to another; each line-casting machine having a driving member controlled according to the length of the line of matrices set up therein, a signaling device at each line-casting machine and at the keyboard, means comprising a change-over switch and controlled by the driving members for actuating the signaling devices, the latter change-over switch being coupled with the former.

8. In apparatus for making type-bars, the combination of a plurality of groups of means for actuating a plurality of line-casting machines, a keyboard, and means comprising a change-over device for operatively connecting said keyboard to any one of said groups of means, locking means for locking the keys of the keyboard, and electromagnetic means comprising a change-over switch and controlled by the driving members for actuating the locking means, said change-over switch being coupled with said change-over device.

9. In apparatus for making type-bars, the combination of a plurality of groups of means for actuating a plurality of line-casting machines, a keyboard, and means for operatively connecting said keyboard to any one of said groups of means; locking mechanism for locking the keys of said keyboard, and releasing means for releasing the said locking mechanism only when the elevator of the line-casting machine which is operatively connected with the keyboard is in its position for beginning a line.

10. In apparatus for making type-bars, the combination of a plurality of groups of means for actuating a plurality of line-casting machines, a keyboard, and means for operatively connecting said keyboard to any one of said groups of means; locking mechanism for locking the keys of said keyboard, and releasing means comprising an electric circuit for releasing said locking mechanism only when the elevator of the line-casting machine which is operatively connected with the keyboard is in its position for beginning a line, said circuit being opened when said locking mechanism is inoperative.

11. In combination, a plurality of groups of means, each group being adapted to actuate an independent line-casting machine, a type-writer, and means for operatively connecting the keyboard of the typewriter to each of said groups of means, locking mechanism for locking the keys of said keyboard, and releasing means comprising an electric circuit for releasing the said locking mechanism only when the elevator of the line-casting machine which is operatively connected to the keyboard is in its position for beginning a line, said electric circuit containing a contact device adapted to be closed only when the carriage of the typewriter is in its position for beginning a line.

12. In apparatus for making type-bars, the combination of a plurality of groups of means for actuating a plurality of line-casting machines, a keyboard, and means for operatively connecting said keyboard to any one of said groups of means; each line-casting machine having a driving member controlled according to the length of the line of matrices set up therein, locking mechanism for locking the keys of the keyboard, a locking electromagnet for actuating the locking mechanism, means comprising a change-over switch and controlled by the driving members for energizing the locking electromagnet, a change-over electromagnet for controlling the shifting of the change-over switch, and manually operated means for energizing the change-over electromagnet.

13. In apparatus for making type-bars, the combination of a plurality of groups of means for actuating a plurality of line-casting machines, a keyboard, and means for operatively connecting said keyboard to any one of said groups of means; each line-casting machine having a driving member controlled according to the length of the line of matrices set up therein, locking mechanism for locking the keys of the keyboard, a locking electromagnet for actuating the locking mechanism, means comprising a change-over switch and controlled by the driving members for energizing the locking electromagnet, a change-over electromagnet for controlling the shifting of the change-over switch, a circuit-closing device in series with the change-over electromagnet and with the locking electromagnet, and manually operated means for closing said circuit-closing device.

14. In apparatus for making type-bars, the combination of a plurality of groups of means for actuating a plurality of line-casting machines, a keyboard, and means for operatively connecting said keyboard to any one of said groups of means; each line-casting machine having a driving member controlled according to the length of the line of matrices set up therein, a signaling device at each line-casting machine and at the keyboard, and means controlled by the driving members for actuating the signaling devices the latter means comprising a stepped circuit-closing device at each type-setting machine.

15. In apparatus for making type-bars, the combination of a plurality of groups of electromagnetic means for actuating a plurality of line-casting machines, a typewriter, means comprising a multiple change-over switch for operatively connecting the keyboard of said typewriter to each of said groups of means, and means actuated by the grip for returning the paper-carriage of the typewriter to its initial position for shifting said switch and thereby changing over the connection of the keyboard from one of said groups to another.

16. In means for making type-bars, the combination of a plurality of line-casting machines, a common keyboard, operatively connecting means for connecting said common keyboard alternatively to one of said line-casting machines, an automatic multiple change-over device for automatically changing the connections between said common keyboard and said line-casting machines after a line has been set up, a common galley for assembling the cast type-bars, and transferring means for transferring the type-bars from said line-casting machines to said common galley.

17. In means for making type-bars the combination with a plurality of line-casting machines, of a common keyboard, operatively connecting means for connecting alternatively said keyboard to one of said line-casting machines, an automatic multiple change-over device for automatically changing after a line has been set up the operative connections between said common keyboard and said line-casting machines from one line-casting machine to another.

In testimony whereof I have signed my name to this specification in the presence of two subscribing witnesses.

HEINRICH DREWELL.

Witnesses:
 WOLDEMAR HAUPT,
 HARRY L. WILSON.